United States Patent [19]
Edberg et al.

[11] Patent Number: 5,638,303
[45] Date of Patent: Jun. 10, 1997

[54] NON-CONTACTING ISOLATED STABILIZED MICROGRAVITY PLATFORM SYSTEM

[75] Inventors: Donald L. Edberg, Irvine; John T. Harduvel, Huntington Beach; David J. Schenck, Los Alamitos, all of Calif.

[73] Assignee: McDonnell Douglas Corporation, Huntington Beach, Calif.

[21] Appl. No.: 496,192

[22] Filed: Jun. 28, 1995

[51] Int. Cl.⁶ .......................... G05B 15/00; F16M 13/00
[52] U.S. Cl. .................. 364/559; 248/638; 364/135; 364/167.01
[58] Field of Search ................. 248/638; 364/135, 364/167.01, 550, 559

[56] References Cited

U.S. PATENT DOCUMENTS

| | | | |
|---|---|---|---|
| 3,860,300 | 1/1975 | Lyman | 310/90.5 |
| 4,033,541 | 7/1977 | Malueg | 247/358 R |
| 4,083,433 | 4/1978 | Geohegan, Jr. et al. | 188/1 B |
| 4,443,743 | 4/1984 | Forys et al. | 318/115 |
| 4,848,525 | 7/1989 | Jacot et al. | 188/378 |
| 4,874,998 | 10/1989 | Hollis, Jr. | 318/568.21 |
| 5,005,678 | 4/1991 | Julien et al. | 188/378 |
| 5,059,789 | 10/1991 | Salcudean | 250/206.1 |
| 5,146,566 | 9/1992 | Hollis, Jr. et al. | 395/275 |
| 5,206,504 | 4/1993 | Sridharan | 250/251 |
| 5,231,336 | 7/1993 | Van Namen | 318/128 |

OTHER PUBLICATIONS

Cunningham et al, "Design of the Annular Suspension and Positioning System (ASPS) (Including Design Addendum)" NASA Contractor Report 3343, contract NAS1-14214 Oct. 1980.

*Primary Examiner*—Edward R. Cosimano
*Attorney, Agent, or Firm*—Ronald M. Goldman; Ronald L. Taylor

[57] ABSTRACT

Microgravity sensitive payloads placed on a platform are isolated from external acceleration forces over extended periods of time in the weightless environment inside an orbiting space vehicle by canceling acceleration on the platform. Wide gap dual axis magnetic actuators and accelerometer pairs are spaced about the platform with the magnetic actuators providing a non-contacting magnetic position control, wherein physical contact with the platform is avoided. Position sensors sense platform positioning and the control system, containing both digital and analog computers, controls the magnetic actuators to ensure proper positioning and neutralize any transient acceleration forces applied to the platform.

11 Claims, 3 Drawing Sheets

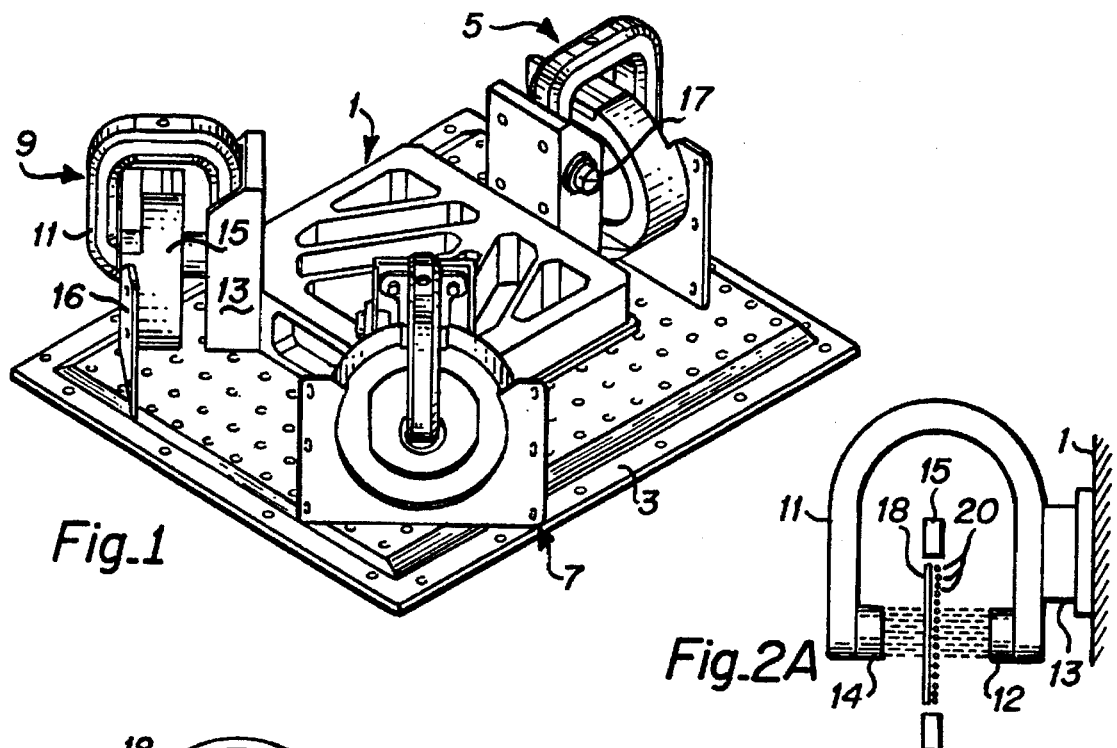
Fig_1
Fig_2A
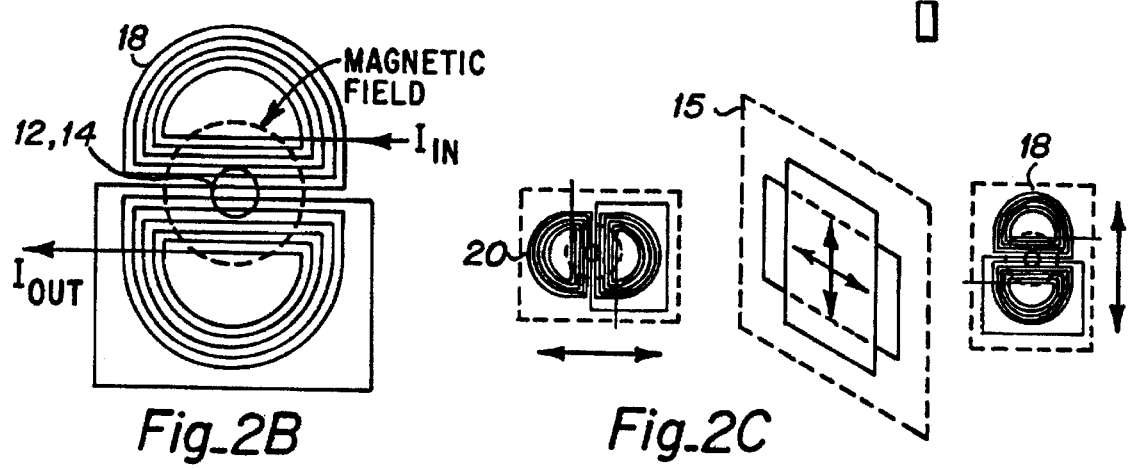
Fig_2B
Fig_2C
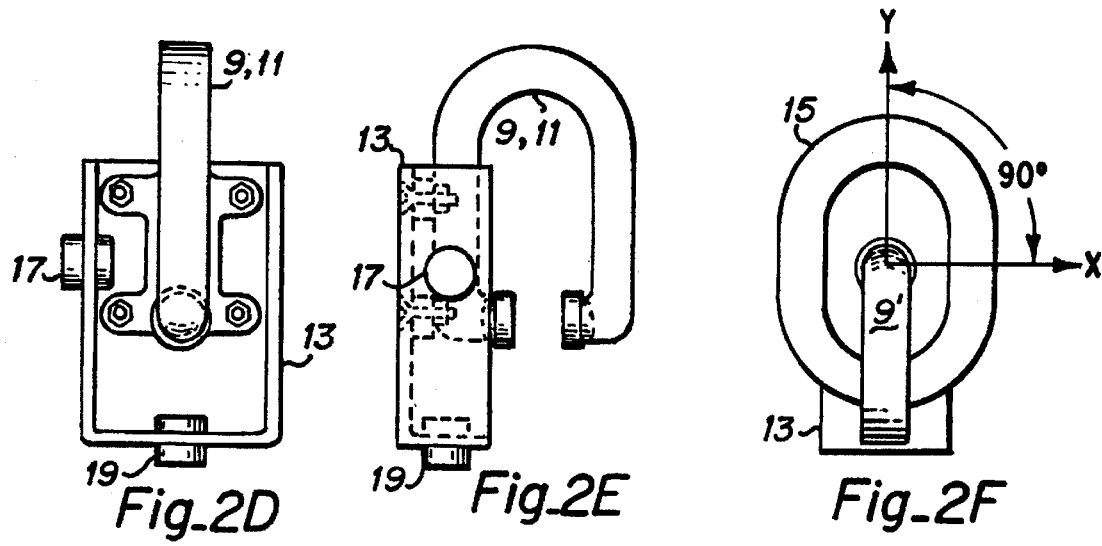
Fig_2D
Fig_2E
Fig_2F

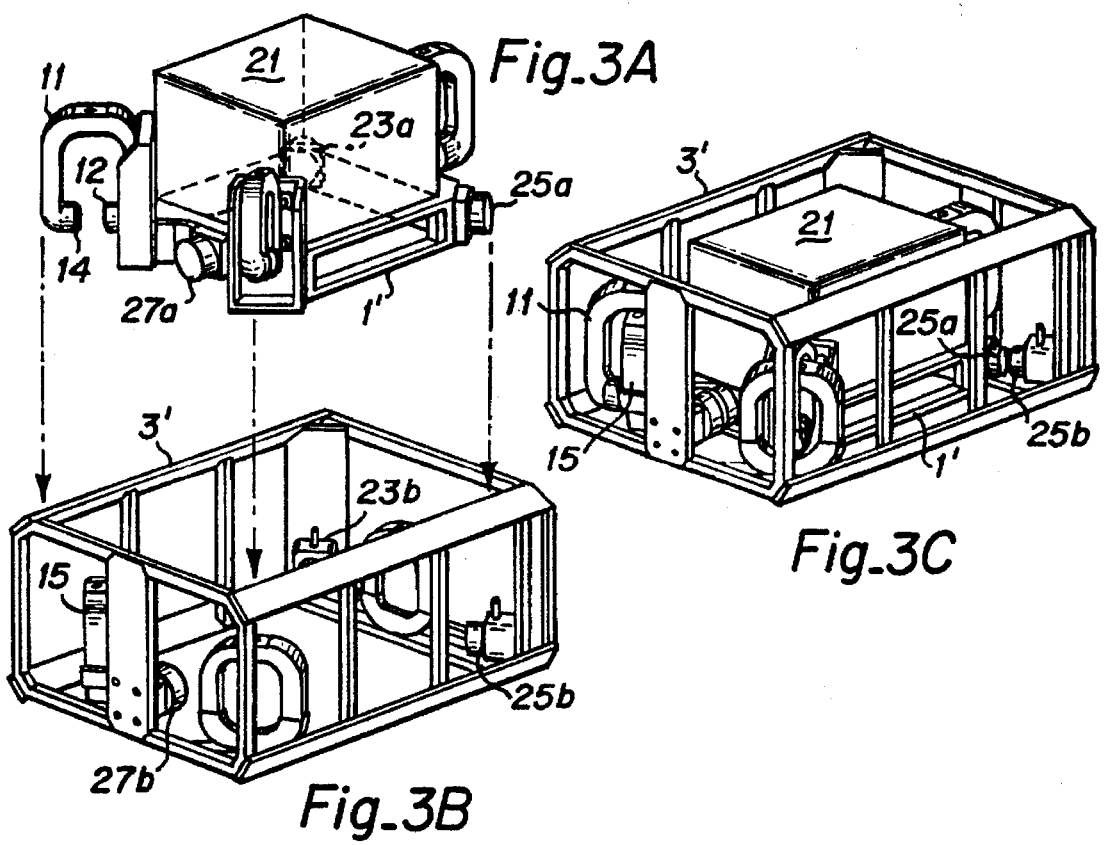
Fig. 3A
Fig. 3B
Fig. 3C
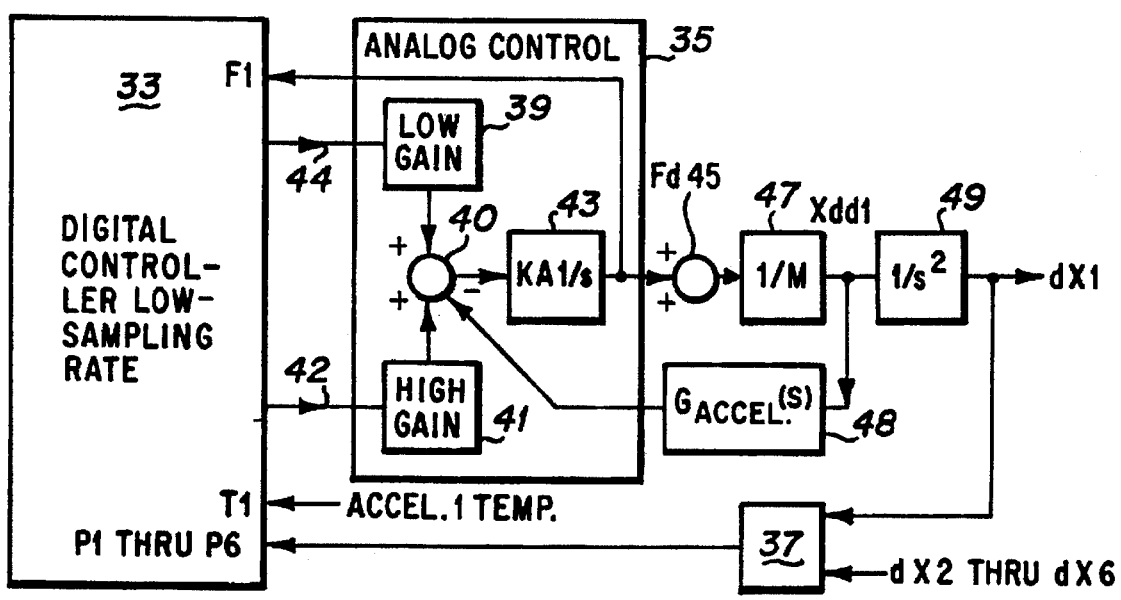
Fig. 5

NON-CONTACTING ISOLATED STABILIZED MICROGRAVITY PLATFORM SYSTEM

FIELD OF THE INVENTION

This invention relates to maintenance of a microgravity environment within a portion of the volume on-board an orbiting space vehicle and, more particularly, to a vibration isolation system and stabilized platform for isolating a microgravity sensitive payload from external acceleration forces that customarily occurs in operation of the space vehicle during orbit.

BACKGROUND

One unique quality of travel aboard a space vehicle, such as the Space Shuttle, is the feeling that occurs due to weightlessness, which few persons are privileged to experience. Within the artificial atmosphere existent in the confines of the space vehicle, persons, objects and materials can simply float in space. In more scientific terms, the environment in an ideal spacecraft is referred to as a microgravity environment, one in which the acceleration experienced by a mass, such as the human body, tools and like, is reduced to the order of one millionth or less of the level found at sea level at the earth's equator, $9.8 \times 10^{-6}$ meters per second per second, relative to the spacecraft.

A microgravity environment has long been recognized as an ideal environment to carry on certain types of experiments and manufacture, which, due to gravity, cannot be carried out on earth. As example, furnaces, crystal growth modules, biological experimental apparatus, combustion and mixing facilities, and materials science investigations, including but not limited to semiconductors, glass amorphous solids, high temperature alloys, ceramics, fluid and combustion physics; biotechnology, including protein crystal growth, separation of biological products, and controlled microgravity experiments, should all benefit in a microgravity environment. To further explore the reasons for the desirability of a gravity-free environment for such experiments and manufactures, the reader may refer to the technical literature for additional details.

Theoretically thus, crystal-growing apparatus and other equipment may be placed in a corner of the space vehicle and allowed to function in a microgravity environment unimpeded. However, transient force effects produced in practice during space vehicle operation interferes with the microgravity; a practical difficulty inherent in space vehicle operation. Astronauts moving about the space vehicle and bumping into or pushing themselves off the space craft's walls create a reaction in the space vehicle; bumping into or shoving off of the equipment itself creates a reaction in the equipment. Performing required exercise on the treadmill, carried in the space vehicle as a physical health measure, produces vibration. Electric motors from time to time are actuated to adjust the position of the spacecraft's solar arrays. That motor operation creates a torque and that torque produces a counter torque on the spacecraft. Each such action produces an equal and opposite reaction, an elementary law of Newtonian physics.

Such shock and vibration are acceleration forces. If the sensitive equipment is thereby momentarily accelerated, that acceleration simulates a gravitational effect, often one that is greater than $9.8 \times 10^{-6}$ meters (per second)$^2$. Thus during the period when all the astronauts are at work, the "work day", the environment in practice is one of only milligees of gravitation, one one-thousandths of earth's gravitational acceleration, several orders of magnitude higher than the ideal. Only when the astronauts are all at rest does the environment consistently achieve a lower level of gravitational effect, such as those produced from time to time by the solar array adjustment motors, interrupted by periods of microgravity.

In a practical spacecraft, the term microgravity is given a more expanded definition which allows for accelerations of microgee levels or below at frequencies of 0.1 Hz or less and increases from that level linearly to milligee levels at between 0.1 Hz and 100 Hz, the latter being the levels produced by the solar array motors and the like. In practice thus, in spacecraft useage, and as used herein, the term microgravity is intended to encompass such an expanded meaning.

While all such microgee and milligee forces are minute by standards on earth, they are significant enough as compared to microgravity levels to jeopardize the results obtained from the on-board experiment or manufacture. A need exists to isolate those manufacturing apparatus requiring a microgravity environment on board the spacecraft from such externally created acceleration forces; to stabilize the manufacturing equipment.

Accordingly an object of the present invention is to enable manufacturing processes and experiments to be carried out in a microgravity environment.

Another object is to isolate selected equipment carried within the environment inside an orbiting space vehicle from large accelerating forces, in excess of the levels of microgravity, over extended periods.

An additional object is to provide a non-contacting active vibration isolation system and a stabilized platform for use within an orbiting space vehicle.

The subject of vibration isolation is not new. Others, including the assignee of the present invention, have heretofore provided active isolation devices for stabilizing aiming and tracking devices used in helicopters, recognized as a high angular vibration environment. Active isolation devices for stabilizing aiming and tracking devices has also found use in space vehicles, a low vibration environment, but in which distance to a potential object being monitored are great, in which the effect of such low vibrations on the target is magnified. Such systems must permit the aiming device to be moved and be pointed at a target and then allow that target to be tracked over a limited period of time. With vibrations isolated to a great degree, a steady aim is possible.

As one example, the McDonnell Douglas Company, Huntington Beach, Calif., assignee of the present invention, markets and sells a stabilized aiming device, referred to as the "McDonnell Douglas Mast Mounted Sight" that is mounted atop the rotor mast on helicopters. That aiming device allows the helicopter pilot to obtain a stable television picture of a distant target, despite the inherent vibrations encountered in helicopter operation.

As another example U.S. Pat. No. 4,848,525 granted Jul. 18, 1989 to Jacot et al for a Dual Mode Vibration Isolator ("Jacot") describes a laser targeting and aiming device intended for use in space vehicles, wherein like the helicopters, transmission of vibrations to the aiming device must be minimized while allowing the laser to be moved. For this Jacot employs a combination of narrow gap magnetic actuators and linear actuators. Jacot notes a prior proposal to use magnetic actuators to support one body relative to another by magnetic fields, citing NASA Contractor Report 3343, entitled "Design of the Annular Suspension and Pointing System", October 1980 in which the actuator's stator is suspended between the pole faces of the stator cores by the magnetic field. Further, Jacot notes that the magnetic actuators in such proposal must contain very large gaps between the pole portions and requires large stators as requires large currents and weight. Jacot concludes that employing wide gap magnetic actuators in on-board orbiting systems is a significant disadvantage.

Applicants recognized that design concerns for a target and aiming systems, which accomplish an assigned function in a short period of time, are not identical with those for a microgravity manufacturing environment, wherein manufacturing is carried out over long periods, such as a day, a week or longer. Even so, the present applicants believe some aspects of vibration isolation in the former kind of apparatus, particularly, the wide gap magnetic actuators, can be employed to advantage in the latter microgravity environment, envisioning an advantage in minimizing the time and expense in design and manufacture. Wide gap magnetic actuators and the associated control electronics are of proven capability and are available essentially off-the-shelf.

A still further object of the invention, therefore, is to provide an easily manufactured non-contacting active vibration isolation system and associated stabilized platform for orbiting space vehicle microgravity manufacturing operations that incorporates wide gap magnetic actuators.

SUMMARY OF THE INVENTION

In accordance with the foregoing objectives a microgravity sensitive payload is isolated from external acceleration forces over extended periods of time in the weightless environment inside an orbiting space vehicle by a platform system that comprises a platform for seating microgravity sensitive apparatus in floating relationship with a frame; a plurality of wide gap magnetic actuators and dual axis accelerometer combinations spaced about the platform and frame; position sensors for sensing position of the platform relative to the frame; and a control system for maintaining the platform in a predetermined position in spaced floating relationship with the frame. The control system includes an analog computer, responsive to the accelerometers, for neutralizing any acceleration forces applied to said platform means; and a digital computer means, responsive to the position sensors, for maintaining said platform means in a predetermined position relative to said frame via the analog computer.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

In the Drawings:

FIG. 1 is a partial perspective view of an embodiment of the mechanical aspects of a platform and base used in the invention;

FIGS. 2A, 2B and 2C schematically illustrate portions of the magnetic actuators appearing in FIGS. 1 and 3;

FIGS. 2D and 2E are pictorial front and side views of the collocated actuator and accelerometer assembly used in the embodiment of FIG. 1, and FIG. 2F is a pictorial view of the actuator depicting the orthogonal direction of actuator movement;

FIGS. 3A, 3B and 3C are partial perspective views of the mechanical aspects of another platform and base used in the invention and their assembly;

FIG. 5 is a functional block diagram of the control system used in the preceding embodiments.

DESCRIPTION OF THE PREFERRED EMBODIMENTS

Figure 4:
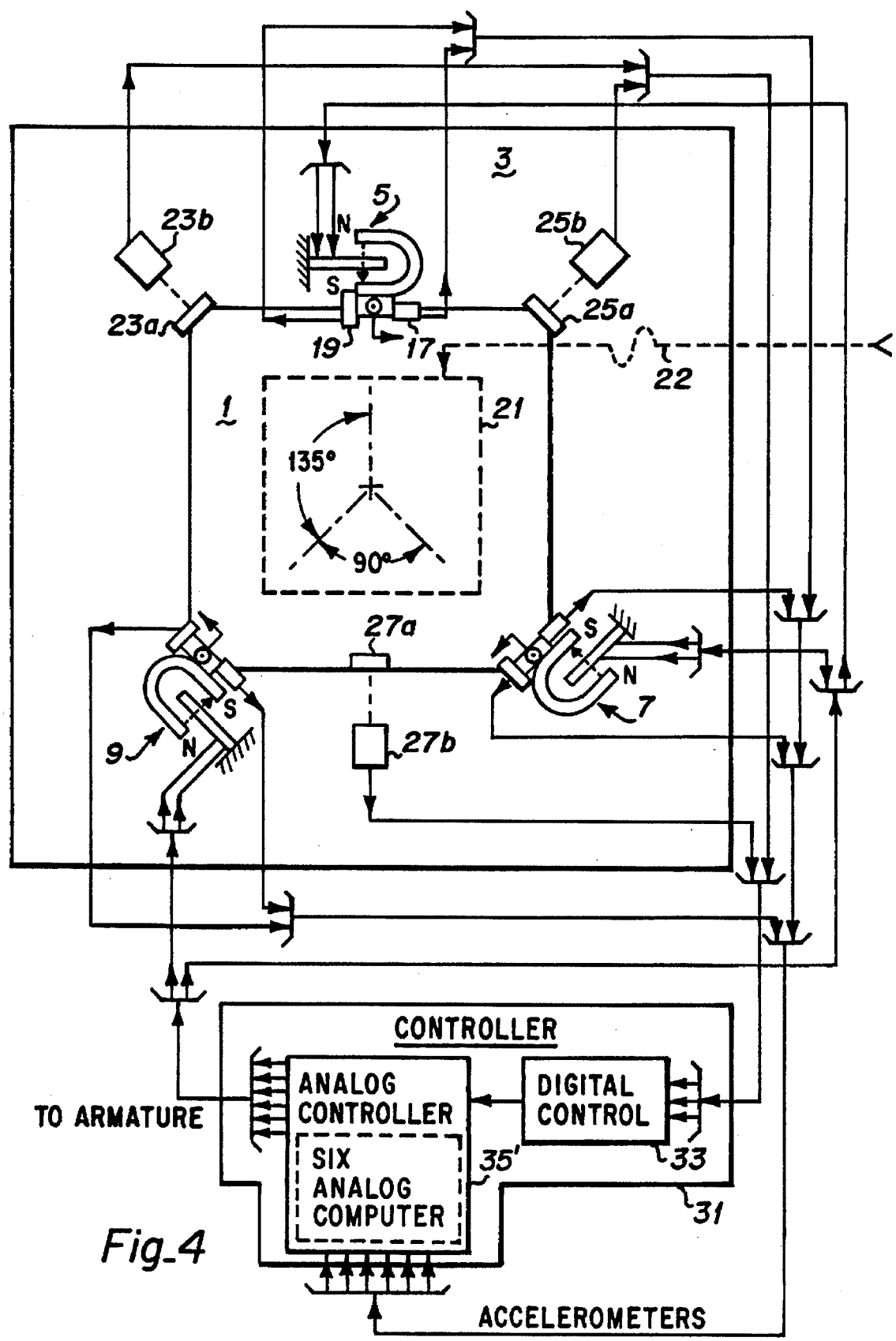
FIG. 4 illustrates the invention in schematic and block diagram form.

Considering first the mechanical aspects of the system as shown in the partial perspective illustration of FIG. 1, to which reference is made, a platform 1 is positioned over a base or frame 3. The illustration is of those elements in orbital operation and, being weightless, platform 1 essentially floats, while frame 3 is tied down or otherwise affixed to and held in a fixed position on the space craft, not illustrated, by brackets or other devices, also not illustrated. Three wide gap magnetic actuators 5, 7 and 9 are included to hold platform 1 in position spaced from frame 3 using magnetic fields without direct physical contact between the frame and platform.

Each magnetic actuator, considering actuator 9 as representative, contains two physically separated parts, that magnetically interact in operation, but are not in physical contact; a pole piece and an armature, the former being connected to the platform and the latter connected to the base. The pole piece includes a horseshoe or U-shaped pole piece 11 formed of ferromagnetic material that contains a permanent magnet at each of the pole piece tips, illustrated at 12 and 14 in FIG. 2A. One of those two magnets connected to pole piece 11 is oriented with its north pole facing horizontally toward and spaced from the other magnet of the pair and the other magnet has its south pole facing horizontally toward the first magnet to thereby establish lines of magnetic flux that extend essentially straight across a relatively wide spacing gap between the pole piece ends and magnets. Pole piece 11 is attached to a bracket 13 and, in turn, the bracket is attached to platform 1 at one of the corners of the rectangular shaped platform.

The magnetic actuator's armature or paddle 15, as variously termed, is suitably formed of electrical coils of wire that is potted within an electrically non-conductive epoxy material. The armature fits within the wide gap formed between the stems of associated pole piece 11 with a portion of the coil located in the lines of flux and another portion of the coil located outside the flux. Armature 15 is supported by and affixed to frame 3 by any conventional means, such as by metal bracket 16. It may be noted that platform 1 appears free to float or move relative to base 3, within limits, until the armature bumps up against the pole piece of one or more actuator. However, as hereafter explained in greater detail, with the controls exerted by the system, the platform should not move to that great an extent, and should remain approximately centered relative to the frame in which it is set by the system operator.

A pictorial of the magnetic actuator and armature coils is illustrated in FIGS. 2A, 2B and 2C to which brief reference is made. FIG. 2A shows an actuator in side view with the pole piece 11 and the armature 15. Note that the armature is of a pancake like geometry and is relatively thin compared to the width of the magnetic gap between the pole piece magnets. An individual coil 18 is wound as shown in FIG. 2B into two D-shaped halves in which the stem of the D is straight and is intended to be immersed in the magnetic field, while the curved section of the D is outside the magnetic field. Two such coils 18 and 20 are oriented as illustrated in FIG. 2C with the straight section of one oriented perpendicular to the straight section of the other.

In the operation of magnetic actuators, electrical current in the armature's electrical coil creates a force on the coil assembly in accordance with the vector relationship $F=nI\times B$, where B is the flux density, n is the number of turns in the coil immersed in the field and I is the current through the coil. That force moves the armature into or away from the lines of flux, depending on the direction of current in the coil, or, relatively speaking, since the armatures are held fixed to frame 3, the force generated thereby causes the pole piece to move in response to such force. Since the pole piece is affixed to the platform, the platform moves accordingly. Thus current through one of the armature coils creates a force in one direction, such as the horizontal direction, and relative movement in that direction; while current through the other coil creates a force in a direction, such as the vertical direction, orthogonal to the first force created by the first coil, and, accordingly, movement in an orthogonal direction.

Returning to FIG. 1, pole piece 11 of magnetic actuator 9 is attached by associated bracket 13 at the lower left corner of the platform and extends radially outward, and its associated armature is oriented perpendicular thereto; the corresponding pole piece of actuator 7 is attached by the associated bracket at the lower right corner and extends radially outward and is oriented at a ninety degree angle to pole piece 11. The associated armature is oriented perpendicular to that pole piece.

The pole piece of actuator 5 is located on the opposite upper side of the platform midway between the other two actuators or between the left and right ends and is oriented in a "wye" or triangular configuration with respect to the remaining two pole pieces, which, in the illustrated embodiment places it at an angle of 135 degrees to each of the two other pole pieces. That relationship maximizes the activation efficiency in the six degrees of freedom in which the platform may be moved, minimizing electrical power consumption and avoiding large current demands. Alternative placement of those actuators is permissible and within the scope of the invention, but such alternative would have lesser electrical efficiency. The pole piece is also attached to the platform by a metal bracket. The associated armature of the actuator is oriented perpendicular thereto. As those skilled in the art appreciate, the foregoing arrangement permits the actuators to move the platform in six degrees of freedom, that is translate the platform in any of three directions and rotate the platform in any of three directions through appropriate current applied to one or more of the three actuators.

Two accelerometers are connected to each pole piece mounting bracket 13, forming a collocated or integral assembly, as variously termed, and, hence, is thus connected with each magnetic actuator, for a total of six accelerometers on the platform assembly. The accelerometers are conventional high sensitivity accelerometers, inertial grade that are capable of sensing microgravity accelerations or lesser. Such accelerometers are available off-the-shelf. As example those produced by the Allied Signal Company of Redmond, Wash.

The accelerometers are oriented orthogonal to one another on a bracket that supports the u-shaped magnet support member of the actuator to monitor any acceleration to which such magnet components are subjected in each of two mutually perpendicular directions or axes. Those two mutually perpendicular directions or axes are the same directions along which the associated magnetic actuator is capable of moving the platform.

Accelerometer 17, illustrated in FIG. 1 with magnetic actuator 5, and accelerometer 19, the latter not being visible in this figure are attached to the magnetic actuator's supporting bracket 13 with the actuator's pole piece to form an integral assembly, essentially being collocated. This is better illustrated in the pictorial front and side views of FIGS. 2D and 2E to which brief reference is made. Both accelerometers are attached to bracket 13 together with the pole piece. Bracket 13 is very rigid and may be formed of a strong metal, such as aluminum. Accelerometer 19 measures acceleration in the relative vertical direction and accelerometer 17 measures acceleration along a perpendicular axis, laterally.

As illustrated in the pictorial of the actuator in FIG. 2F, each actuator moves the armature relative to the frame in each of two mutually orthogonal directions, labeled x and y, up or down, to or fro along such axes. The accelerometers are arranged to measure acceleration along those same axes. Ideally, for the best theoretical accuracy, the two accelerometers should be positioned at same focal point as the armature to pole piece center, but that is not physically possible. By mounting those accelerometers as close to that location as possible and ensuring a rigid connection with the pole piece through the rigid mounting bracket 13, the best possible measuring arrangement is achieved.

Returning to FIG. 1, one observes that the the six accelerometers on the platform provide acceleration information on six degrees of movement, displacements and rotations along each of a set of three orthogonal axes. The accelerometer also conventionally includes a temperature sensing device and associated output circuit, discussed later herein, for temperature calibration purposes. The outputs of the accelerometers are later further described in connection with the control system.

The foregoing magnetic actuators are recognized as being the two axis wide gap torquer manufactured by the McDonnell Douglas Company, Huntington Beach, Calif., assignee of the present invention, which is marketed and sold as part of that company's Mast Mounted Sight, a stabilized aiming device intended to be mounted atop the rotor mast on helicopters on which that system is employed. That aiming device allows the helicopter pilot to obtain a stable television picture of a distant target, despite the large vibrations encountered in helicopter operation. Aspects of that wide gap torque are described in the patent literature in U.S. Pat. No. 4,443,743 and U.S. Pat. No. 4,833,351 and some related aspects in U.S. Pat. No. 4,033,541, and U.S. Pat. No. 3,703,999 to which the interested reader may refer.

The platform in the embodiment of FIG. 1 is a machined metal part that contains cut out portions leaving essentially a frame like member with bracing ribs for increased stiffness. However, any structure that is rigid enough to place its natural frequencies of resonance well above the bandwidth of the control system, later herein described, and accommodate the particular mountings needed by the sensors and actuators and the scientific or commercial gravity sensitive payload to be mounted to the platform may be substituted.

Three position sensors, not illustrated in FIG. 1 for clarity, are included in the assembly on frame 3. Those position sensors monitor the position or spacing between the platform 1 and base 3 and thereby detect any relative movement, tilt or rotation of the platform and supply that information to the electronic controllers, discussed hereafter. Position sensors are illustrated in the different mechanical embodiment of the platform and frame considered in the succeeding figures.

Reference is next made to FIGS. 3A, 3B and 3C which show an alternative mechanical configuration for the platform and frame and its easy assembly. For convenience, the component elements which appear in these figures are given the same designation used for those elements in FIG. 1. As shown in the perspective view of FIG. 3a, a payload, represented by box 21 is attached to platform 1'. Position sensors 23, 25 and 27, which contain two spaced parts, labeled a and b, respectively, have the sensor source portion mounted to platform 1', as at 23a, 25a, and 27a, and the target section mounted to frame 3', as at 23b, 25b and 27b. The actuator pole pieces, such as 11, accelerometers, not visible in this view, and the target portion of the position sensor are each illustrated in preferred locations on the platform. Frame 3' appears in FIG. 3b as being in the form of a ribbed rectangular cage. The frame contains the actuator armatures, such as 15, which are of a somewhat paddle shape and the remaining portion of the position sensors, illustrated at 23b, 25b and 27b. Although the position sensors are illustrated as being separate from the actuator dual axis accelerometer assembly in the preceding figures, a more preferred arrangement is to use the assembly created by one of the present inventors in which the position sensors are mechanically packaged in a single assembly, which is now the subject of a copending patent application Ser. No. 08/576,232 filed Dec. 21, 1995, entitled Collocated Sensor Actuator. That improvement simplifies fabrication and assembly of the platform and avoids any slight inaccuracy in measurement as might be caused by flexure in the platform or variation in mounting of parts.

As is evident the mechanical arrangement allows the platform to be inserted within the frame, the open end of each pole piece easily fitting over the associated armature, with the latter fitting in spaced relation to the pole pieces without physical contact, an advantage to the invention, and the assembled relationship appears as in FIG. 3C. For convenience the various connections to payload 21, such as electrical cables, vacuum lines and the like, and those containing the electrical leads to the accelerometers on the platform, necessarily used in the practical embodiment, are omitted for clarity in illustration.

From the foregoing, it is apparent that the platform may be separate from the payload or may be formed integral therewith. As used herein, thus, the term "platform" refers not only to a base or panel on which microgravity laboratory apparatus or manufacturing apparatus and the like, the "payload" is fastened or otherwise attached in the weightlessness of outer space and, in a more generic sense, also refers to a portion of the payload itself, such as a frame portion or panel portion of such laboratory and manufacturing apparatus to which the magnetic actuator and dual accelerometer combination is attached as described, which, in the system, serves the same function as a separate frame or panel, although being integral with the manufacturing apparatus.

Reference is made to the stabilization system presented in the block diagram and pictorial form in FIG. 4. The foregoing mechanical assemblies are pictorially illustrated as part of the system and those elements earlier described are identified by the same number used for same earlier in FIGS. 1, 3a, 3b, and 3c. A microgravity sensitive payload 21 situated upon platform 1 is represented by dash lines, as is the associated umbilical 22 which carries electricity, vacuum, and/or fluids required by the payload for operation.

As illustrated, the umbilical 22 extends from frame 3 to platform 1. Those umbilical together with those electrical leads to the accelerometers, represent the sole physical connection between the frame or external areas and the platform. Although the structure of those umbilical is purposely made as soft or limp as is possible so as to dampen or prevent transmittal of any force due to shock or vibration occurring on the frame side of the umbilical from reaching the platform, such isolation is not entirely possible and some small level of force or vibration may reach the platform due to the stiffness of the umbilical coupling the platform to the base. In addition a surge in the fluid lines, or in the vacuum lines, when such types of lines are used for a given payload, as example, creates a mechanical force that travels along the line that is sufficient in level to disturb the experiment or manufacturing process of the payload. As becomes apparent, the present system compensates for any such disturbing force.

The system includes a controller 31 that includes a digital computer-controller 33 and an analog computer-controller 35. Each of position sensors 23b, 25b and 27b is connected, via cables, to the digital computer 33 and provides position information to that computer, together providing complete information on the platform's position, including tilt and rotation. Each of the coils in the respective armatures of the magnetic actuators is coupled to the output of the analog computer, whereby the analog computer supplies appropriate electrical current to actuators 5, 7 and 9 that serves to create the magnetic forces to cancel the platform's acceleration or hold the platform steady against load forces as might be caused by the umbilical extending to the payload or by disturbances caused by the payload.

An output of digital computer 33 is connected to an input of the analog controller. When the digital computer senses that the platform is shifting in position, the computer issues a centering command to the analog controller. Responding to that command, the analog controller issues the appropriate output to the armatures of the respective magnetic actuators 5, 7 and 9. Each of the accelerometers is connected to corresponding inputs of analog computer 35. The accelerometers provide information of the inertial acceleration along a given axis and each pair of accelerometers provide that information along two mutually perpendicular axes at each location at which the accelerometers are located, such as was illustrated in FIGS. 1 and 2. As graphically represented in connection with actuator 5 the arrow and encircled dot indicate the orthogonal directions measured by the associated pair of accelerometers, up and down relative to the plane of the paper as represented by the encircled dot and straight across the figure as represented by the adjacent arrows. Like representations are included for each of the other two actuators 7 and 9. Of those, both measure along an axis orthogonal to the plane of the paper, while the associated orthogonol axis, along the plane of the paper, are angled relative to that axis which extends from actuator 5.

The control system uses the information from the accelerometer pairs and position sensors to inertially stabilize and position the platform within the "sway space". It includes a high bandwidth decentralized analog inertial acceleration control loop; a low bandwidth digital position control loop, and a low bandwidth digital force management control loop. As those skilled in the art appreciate, the foregoing functional operation is best described in terms of a functional block diagram of one of the six channels, such as is presented in FIG. 5, to which reference is made.

Digital controller or computer, as variously termed, 33 is suitably one that has a low sampling rate, analog controller or computer, as variously termed, 35 and a control loop for only one of the two axes of movement of one of the magnetic positioning actuators, such as 5 in FIG. 4, are shown. While only one channel is illustrated in this diagram it is understood that a different analog computer is provided for each channel; six in the arrangement described. However, a single digital computer 33 is employed. Whereas, the digital computer illustrated in this diagram contains an output connected to one of the analog computers it is understood that the digital computer contains multiple outputs, one output for each of the analog computers, comparable to the one set of outputs illustrated.

In this block diagram, the elements to the right of the Analog control block, as is conventional practice, represent physical actions, such as forces 45, accelerations, Xdd1, and displacements dX1. A force disturbance, Fd, 45 applied to the platform mass 47 produces an acceleration, Xdd1. That acceleration, Xdd1 is then fedback through the circuit 48, by accelerometer, $G_{accel}$, to the input of the loop, represented by the "summing block" circle 40. That acceleration signal is in turn acted upon at block 43 to produce a contra force signal at the output of 43 to null or cancel the disturbance force. The acceleration Xdd1, continued for any time results in displacement, indicated at dX1, following the double time integration indicated by 49 which ideally is minimal, if, as desired the disturbance force is effectively cancelled out in the fedback arrangement, reducing any acceleration to zero. As those skilled in the art recognize, the foregoing is a standard force or acceleration nulling system.

Initially digital computer 33 receives inputs at T1 to detect temperature information from the associated accelerometer. As is known accelerometers are ambient temperature sensitive and, therefore its output may differ, depending on the particular temperature existing. The accelerometers thus are calibrated from time to time to adjust the bias currents for a given ambient temperature. That calibration ensures that the accelerometers outputs are accurate. This calibration is conveniently handled by digital computer 33, which contains the appropriate calibration information for the various temperatures and the corresponding bias levels needed for compensation stored in its memory. With the temperature information as input, the digital computer outputs the appropriate bias currents thus to the control loop via an output 42, through high gain digital to analog controller 41 or through the low gain channel, as appropriate, and from there to the input or summing junction 40 of the control loop. The digital computer determines the size of the signal to be outputted and selects the appropriate high or low gain channel as appropriate for the output.

The displacement in the channel illustrated is represented as dX1, and the displacements in the remaining five channels are represented as dX2 through dX6 are connected to a position sensor subsystem 37 which converts displacements of the platform into a non-singular set of measurements representing position that provides a minimum of six outputs, which are applied as inputs P1 through P6 to digital computer 33. It should be recognized that in other embodiments, incorporating additional actuators and position sensors, additional displacement channels would be included and that additional inputs may likewise be provided to the digital computer for input of additional position representing numbers.

Following the start up and correction of accelerator bias, digital computer 33 monitors the position of platform 1 by monitoring the position sensors 23, 25, and 27 at input P1 through P6. In customary manner, computer 33 is programmed to scan each such input in serial order and check the information thereby received against the position information stored in its memory. When the digital computer senses a condition at any of those inputs that represents a change of position of the platform from its center position, the computer determines the necessary outputs and outputs appropriate acceleration commands to one or more of the six analog computers, and assuming one is necessary for the illustrated channel, outputs a command via 44 over the low gain 39 to the analog controller. The analog computer issues the electrical current to the respective magnetic actuators to restore the platform to its correct predetemined position.

The digital computer serves another function that is indicated in FIG. 5, serving to resolve and balance multiple magnetic actuators in the system. If the particular system contains extra, that is, redundant, sets of magnetic actuators, it is possible for some combination of actuators to be acting contrary to one another, applying force in opposite directions, as example, in which instance large and unnecessary amounts of electrical power, a precious commodity on board a spacecraft, to be consumed. To avoid that occurance, the digital computer monitors the force applied to the platform by each magnetic actuator. Thus, F1, which is a measure of force that the actuator in this channel is applying in one direction is input to the computer, as is the corresponding force for the other perpendicularly directed force of the same actuator and for each of the other four additional channels associated with the two remaining magnetic actuators.

The computer then uses that information to determine if a force imbalance exists and, if so, internally recognizes a balance error. Once a balance error is determined, the computer creates an acceleration command that is proportional to the imbalance in forces and outputs that command via output 44, the low gain digital to analog converter, to add to the acceleration command existant at 40. If the level of imbalance is large enough the computer may also output an acceleration command from the high gain channel via output 42.

The acceleration control loops isolate the platform from base motion and attenuate on-platform disturbances. In this mode, the magnetic actuators hold the platform movement to approximately zero acceleration, while the platform may drift slightly from the center position. With the appropriate acceleration control loop compensation, the overall system isolation performance is relatively insensitive to the base motion disturbances as might be coupled to the platform through umbilical cables.

The low bandwidth position loop generates inertial acceleration commands from the set of position measurements, maintaining the platform's position within the sway space. Thus should the platform be found to have moved relative to the platform, the position sensors provide the position information to the position loop and the position loop generates sufficient acceleration commands to start movement. As the platform is moved toward the center position within the frame, the sensors continue to provide new position information, new commands are determined and issued, the magnetic actuators are appropriately energized with the appropriate level of current and create the appropriate magnetic force to move the platform. This centering process continues until the platform is returned to the center of the sway space. In this mode the magnetic actuators recenter the platform at the predetermined position.

The high bandwidth control system functions are implemented by an analog processor or computer, which renders the system more responsive and reliable in orbital operation. As those skilled in the art recognize, analog electronics is inherently more quick acting than digital and is less susceptible to single event upset, SEU, caused by incidence of cosmic rays and high energy particles. Such incident energy often induces faults in high speed digital computers, either causing an upset, which is temporary in nature, or a latch up, in which the high speed digital computer cannot reset itself and is thereby rendered incapable of carrying out its stored programming. Those faults are not found in the low speed digital computer, which is preferably used with the invention. Such low speed digital computer, contains a digital processor whose transistor chip structure is fabricated with spacings on the order of three microns, while the high speed digital computer contains processors fabricated using spacings on the order of ½ to 1 micron, which makes the latter more vulnerable to any incident high energy particles.

The control system should be recognized as the same elements found in the foregoing helicopter "Mast Mounted Sight" control system, except that in the helicopter control system what the computer commands is angular velocity, and the feedback is angular position, whereas in the present system what the computer instead commands is acceleration and the feedback is force and translational position and a minimum of three magnetic actuators are used, giving six degrees of freedom of movement instead of only two actuators and two degrees of freedom in the helicopter system.

A weightless platform intended to essentially float in the defined region within the frame is, however, subject to steady state forces associated with the pre-loads created by the umbilical cables that extend between the frame and the platform, including those to the payload and gravity gradient forces. The platform is also affected by the consequences of aerodynamic drag that the space vehicle encounters, a force that gradually slows the space vehicle. Such also slows the frame, but not the platform and as a consequence, the frame moves toward the platform. The centering system corrects for all of the foregoing effects.

The low bandwidth force management loop selects the appropriate force control system compensation to generate inertial acceleration commands that manage redundant actuator and accelerometer control loops in overdetermined actuator accelerometer pair configurations. "Overdetermined" means that the required forces could be provided by a non-unique arrangement of actuators. That is not unusual. As example, a minimum of three actuators is necessary to position the platform in any of six degrees of motion, positive or negative in the x, y and z axial directions. If instead four actuators are employed by choice in the system, it is apparent that more than one solution is available to move the platform to a given position, using three actuators or four and so on. The integral arrangement of actuator and dual accelerometers simplifies system design. For one reason, such unit is readily available off-the-shelf, and for another the mechanical design reduces volume, cost assembly time and part count. Three such dual axis sensing units accomplishes the same work as six separate single axis units.

The only contact between the platform and frame is through small, soft or limp, as variously termed, umbilical. Platform controlling and centering forces are applied between the armatures and the field of the magnet assembly. Because there is no contact between the magnets and the associated armatures, there is no transfer of force across the gap, except that due to current flowing in the armature. No force is coupled through the gap even when the armature moves relative to the magnetic filed. No cogging forces occur because the paddle is non-ferrous; no eddy current forces are produced, because the armature is electrically non-conductive, except for the embedded coils; no ripple forces appear because the actuator is not commutated and no back EMF forces are generated because the actuator is driven by high bandwidth current source, one greater than 2 kHz.

Because the actuators do not require physical contact between the frame and platform or payload, mechanical disturbances created on-board the spacecraft, including those disturbances affecting the frame, are not communicated to the platform. The non-contacting actuators avoid a potential disturbance load path to the platform inherent in mechanical type actuators, through the actuation mechanism. Non-contacting actuators eliminate the need for pushrods, flexures, hinges, pivots and other mechanical mechanisms that decrease performance due to friction, slop, free-play, or other mechanical effects and avoid the possibility that the actuator itself might decrease performance due to the effects of any flexibility inherent in the components that form a mechanical actuator. Of additional advantage, installation, operation and servicing of the payload is simplified; one need only disconnect the electrical umbilical cord to the payload and withdraw the payload from the frame without the necessity for mechanically disassembling any of the actuators.

The computation required by the centering loop is low level, such as at 10 Hz., ten samples per second, which is very slow. Being thus slow and essentially little used, the digital processor does not generate significant heat and, hence, liquid or forced air cooling, characteristically required of high speed computers, is not required. Since only low sample rate computations are required, the digital processor employed in the system is preferably a proven one that is known to have substantial immunity to SEU's, such as the Intel 80196 processor, as example. For the foregoing reasons a fast digital computer is neither required nor desired in the present system.

It is also seen that the isolation arrangement is particularly suited to a "kit" approach, which is readily adapted to any geometry ranging from a "glovebox" size volume up to a full orbiting rack or larger.

The position control loops also set the base to platform stiffness. That stiffness determines both the low frequency isolation performance and the speed of response of the centering system. In a practical embodiment of the invention, as example, the digital computer is programmed to reposition the platform in one-hundred seconds, doing so by issuing commands at only ten commands per second. And that rate is used for each of the dual axis actuators. This is recognized as a very soft spring like stiffness. Conveniently, the digital position controller architecture permits independent tailoring of the low frequency stiffness and damping characteristics of the positioning system in each of the six degrees of freedom in which the platform may be translated or rotated. In alternative embodiments other rates may be selected to achieve different stiffness, with well understood modifications to the digital computer's program, and the rates in each of the six degrees of freedom may be different from one another to satisfy the designer's particular goals.

In addition to isolating the tray or platform from mechanical disturbances on the orbiting satellite, the system may be easily adapted instead to provide pre-programmed sinusoidal or general periodic shaking of the platform in experiments and or manufacturing techniques, not presently known, as requires controlled measures of movement or acceleration in the direction of any or all of the three independent axes of movement. The foregoing may be accomplished by substituting a software program into the computer that gives the appropriate movement commands.

The foregoing describes the operation of the stabilized platform assembly during orbit. It is recognized that on earth and during lift off into orbit, the platform is properly stowed, either in place in the rack, by fastening it down, or separately stowed and assembled only after the space vehicle is in orbit, prior to activating the manufacturing operation in the payload.

The foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. Apparatus for maintaining an essentially microgravity platform environment over extended periods of time in the weightless environment inside an orbiting space vehicle, comprising:

platform means for seating microgravity sensitive apparatus;

frame means;

said platform means being in spaced floating relationship with said frame means without physical contact therebetween and being located in a predetermined position;

a plurality of wide gap magnetic actuator means and dual axis accelerometer means combinations, located spaced about said platform means and said frame means;

position sensor means for monitoring the position and orientation of said platform means;

control means for maintaining said platform means in predetermined spaced relationship with said frame means;

said control means including:

digital computer means, responsive to said position sensor means, for producing a command signal responsive to detection of a change in position or orientation of said platform means relative to said frame means;

analog computer means coupled to said magnetic actuator means;

said analog computer means being responsive to said accelerometer means, for supplying current to said magnetic actuator means, wherein said magnetic actuator means neutralizes any acceleration produced by forces applied to said platform means; and said analog computer means being responsive to said command signal from said digital computer means for supplying current to said magnetic actuator means, wherein said magnetic actuator means repositions said platform means to said predetermined position.

2. The invention as defined in claim 1, wherein said plurality of wide gap magnetic actuators comprises three in number, each of said wide gap magnetic actuators being capable of moving said platform means in each of two mutually perpendicular directions; and wherein said analog computer means comprises a plurality of at least three pairs of analog computers, each of said pairs of analog computers being associated with a respective one of said wide gap magnetic actuators with one of said analog computers of a pair for supplying current to said wide gap magnetic actuator to force said platform means in one direction and the other of said analog computers of said pair for supplying current to said wide gap magnetic actuator to force said platform means in the orthogonal direction; and wherein said digital computer means, includes an output for each of said analog computers for supplying command signals to each said analog computer.

3. Apparatus for maintaining an essentially microgravity platform environment over extended periods of time in the weightless environment inside an orbiting space vehicle in the presence of external acceleration forces, momentary and sustained, applied to said space vehicle, comprising:

platform means for seating microgravity sensitive apparatus;

frame means;

said platform means being in spaced floating relationship with said frame means without physical contact therebetween and in a predetermined position;

a plurality of magnetic actuator means and dual axis accelerometer means combinations, located spaced about said platform means and said frame means;

each said magnetic actuator means comprising:

a U-shaped pole piece and permanent magnet combination having spaced ends defining a wide magnetic gap between said spaced ends for creating a magnetic field across said spaced ends; and armature means;

said armature means comprising at least one electrical coil;

said armature means having a thickness that is less than said wide magnetic gap, wherein at least a portion of said armature is capable of movement within said wide magnetic gap, transverse said magnetic field responsive to application of electric current to said coil, and lateral movement beween said spaced ends, without physically contacting said respective pole piece and permanent magnet combination;

bracket means for attaching said pole piece and magnet combination to said platform means;

means attaching said armature means to said frame means;

each said dual axis accelerometer means comprising means for producing individual signals representative of acceleration of said platform in each of two mutually orthogonal directions and each said dual axis accelerometer means being capable of detecting acceleration at sensitivities of no less than $9.8 \times 10^{-6}$ meters per second per second;

said magnetic actuator means and dual axis accelerometer means combinations being positioned about said platform means to detect any acceleration occuring along each of three mutually orthogonal axes of a cartesian coordinate system to detect any lateral or rotational movement of said platform;

a plurality of at least three position sensing means for sensing the positioning of said platform means relative to said frame means along at least three mutually orthogonal directions to sense change of position and orientation in any of three orthogonal directions and three directions of rotation;

control means for maintaining said frame means in said predetermined position in spaced floating relationship with said platform means;

said control means including:

analog computer means coupled to said wide gap magnetic actuator means, and responsive to said accelerometer means, for supplying correction current to said wide gap magnetic actuator means to neutralize any acceleration forces applied to said platform means;

and digital computer means coupled to said analog computer means, and responsive to said position sensors, for supplying correction signals to said analog computer means;

said analog computer means, responsive to said correction signals from said digital computer means, for supplying current to said wide gap magnetic actuator means to maintain said platform means in a said predetermined position spaced relative to said frame means to thereby neutralize drift of said platform means occuring through at least atmospheric drag, gravity gradient, umbilical bias force and any steady applied forces or acceleration.

4. Apparatus for maintaining an essentially microgravity platform environment over extended periods of time in the weightless environment inside an orbiting space vehicle, comprising:

platform means for seating microgravity sensitive apparatus;

frame means;

said platform means being in spaced floating relationship with said frame means without direct physical contact therebetween;

a plurality of magnetic actuator means and dual axis accelerometer means combinations, located at individual positions spaced about said platform means and said frame means for maintaining said platform means in spaced floating relationship with said frame means with said positions defining at least a triangle, whereby said actuator means is capable of moving said platform means in each of three orthogonal directions and three rotational directions;

each said magnetic actuator means comprising:
a U-shaped pole piece and permanent magnet combination having spaced ends defining a wide magnetic gap between said ends for creating a magnetic field between said spaced ends; and armature means;

said armature means containing at least two electrical coils with one of said coils being oriented perpendicular to the other;

said armature means having a thickness that is less than said wide magnetic gap, wherein said armature is capable of movement within said wide magnetic gap in at least two mutually perpendicular directions, responsive to application of electric current to said coils, without physically contacting said respective pole piece and permanent magnet combination;

said pole piece and magnet combination being connected to said platform means and said armature means being connected to said frame means, whereby movement between said pole piece and magnet combination produces movement between said platform means and said frame means;

each said dual axis accelerometer means comprising means for producing individual signals representative of acceleration of said platform means in each of two mutually orthogonal directions and each said dual axis accelerometer means being capable of detecting acceleration at least as small as $9.8 \times 10^{-6}$ meters per second per second.

5. The invention as defined in claim 4, further comprising:
position sensing means for sensing the positioning of said platform means relative to said frame means to detect position in any of three orthogonal directions and rotation in any of three directions.

6. The invention as defined in claim 5, wherein said plurality of magnetic actuator means comprises three in number; and wherein said platform means includes front and rear side edges; and where said magnetic actuator means are angularly spaced in position from one another, with two of said actuator means being located along one side edge and said remaining actuator means is positioned on an opposed side and midway between said first two actuator means.

7. The invention as defined in claim 5, further comprising:
control means for maintaining said platform means in predetermined spaced relationship with said frame means;

said control means including:
digital computer means, responsive to said position sensor means, for producing a command signal responsive to detection of a change in position or orientation of said platform means relative to said frame means;

analog computer means coupled to said magnetic actuator means;

said analog computer means being responsive to said accelerometer means, for supplying current to said magnetic actuator means, wherein said magnetic actuator means neutralizes any acceleration forces externally applied to said platform means; and said analog computer means being responsive to said command signal from said digital computer means for supplying current to said magnetic actuator means, wherein said magnetic actuator means repositions said platform means to said predetermined position.

8. The invention as defined in claim 5, wherein said frame means defines a cavity, and wherein said platform means fits within said frame means, said cavity having an opening through which to receive said platform means, whereby said platform means is inserted into said opening into place within said cavity with said pole pieces of said magnetic actuator means fitting into place over said armatures.

9. The invention as defined in claim 8, further comprising:
control means for maintaining said platform means in predetermined spaced relationship with said frame means;

said control means including:
digital computer means, responsive to said position sensor means, for producing a command signal responsive to detection of a change in position or orientation of said platform means relative to said frame means;

analog computer means coupled to said magnetic actuator means;

said analog computer means being responsive to said accelerometer means, for supplying current to said magnetic actuator means, wherein said magnetic actuator means neutralizes any acceleration forces externally applied to said platform means; and said analog computer means being responsive to said command signal from said digital computer means for supplying current to said magnetic actuator means, wherein said magnetic actuator means repositions said platform means to said predetermined position.

10. Apparatus for maintaining an essentially microgravity platform environment over extended periods of time aboard an orbiting space vehicle, comprising:

- platform means for seating microgravity sensitive apparatus;
- frame means;
- said platform means being in spaced floating relationship with said frame means without direct physical contact therebetween; and
- means coupled to said platform means for neutralizing any acceleration forces applied to or originating upon said platform means and for maintaining said platform means at a predetermined spaced position relative to said frame means.

11. Apparatus comprising in combination:

- platform means for seating microgravity sensitive apparatus;
- frame means;
- said platform means being in spaced floating relationship with said frame means without direct physical contact therebetween; and
- means coupled to said platform means for neutralizing any acceleration forces applied to or originating upon said platform means and for maintaining said platform means at a predetermined spaced position relative to said frame means.

* * * * *